United States Patent
Sassounian

(10) Patent No.: US 8,107,228 B2
(45) Date of Patent: Jan. 31, 2012

(54) LAP TOP COVER DISPLAY

(76) Inventor: Sylva A. Sassounian, San Dimas, CA (US)

(*) Notice: Subject to any disclaimer, the term of this patent is extended or adjusted under 35 U.S.C. 154(b) by 168 days.

(21) Appl. No.: 12/218,595

(22) Filed: Jul. 17, 2008

(65) Prior Publication Data

US 2010/0012240 A1    Jan. 21, 2010

(51) Int. Cl.
  *G06F 1/16* (2006.01)
  *B65D 85/00* (2006.01)
  *A47B 81/00* (2006.01)

(52) U.S. Cl. ......... 361/679.26; 361/679.27; 361/679.55; 206/320; 312/223.1; 312/223.2

(58) Field of Classification Search ........... 361/679.01–679.45, 679.55–679.59; 206/320; 345/156, 157, 168, 169; 312/223.1, 312/223.2
See application file for complete search history.

(56) References Cited

U.S. PATENT DOCUMENTS

| | | | |
|---|---|---|---|
| 5,590,021 A | 12/1996 | Register | |
| 5,592,361 A * | 1/1997 | Smith et al. | ............. 361/679.01 |
| 5,745,340 A | 4/1998 | Landau | |
| 5,796,577 A | 8/1998 | Ouchi et al. | |
| 6,149,001 A * | 11/2000 | Akins | ........................... 206/320 |
| 6,267,236 B1 | 7/2001 | Seok | |
| 6,392,876 B1 | 5/2002 | Ramonowski | |
| 6,520,607 B2 | 2/2003 | Pfaff | |
| 6,643,124 B1 | 11/2003 | Wilk | |
| 6,667,877 B2 | 12/2003 | Duquette | |
| 6,686,900 B1 | 2/2004 | Levy et al. | |
| 6,775,128 B2 | 8/2004 | Leitao | |
| 6,778,383 B2 | 8/2004 | Ho | |
| 6,781,825 B2 | 8/2004 | Shih et al. | |
| 6,909,597 B2 | 6/2005 | Tutikawa | |
| 6,967,632 B1 | 11/2005 | Minami et al. | |
| 7,031,148 B1 * | 4/2006 | Lin | ........................ 361/679.08 |
| 7,061,472 B1 | 6/2006 | Schweizer et al. | |
| 7,206,618 B2 | 4/2007 | Latto et al. | |
| 7,248,463 B2 | 7/2007 | Bander et al. | |
| 7,280,349 B2 | 10/2007 | Anderson et al. | |
| 7,301,761 B2 | 11/2007 | Merz et al. | |
| 7,545,627 B1 | 6/2009 | Lantigua | |
| 2004/0196209 A1 | 10/2004 | Chen et al. | |
| 2006/0193109 A1 * | 8/2006 | Bander et al. | ................. 361/681 |
| 2006/0198087 A1 * | 9/2006 | Anderson et al. | ............ 361/681 |
| 2006/0226040 A1 | 10/2006 | Medina | |
| 2007/0086154 A1 | 4/2007 | Koch | |
| 2007/0115621 A1 * | 5/2007 | Guillen | ........................ 361/683 |
| 2007/0279855 A1 | 12/2007 | Linsmeier et al. | |
| 2008/0043421 A1 | 2/2008 | Staples | |
| 2008/0074833 A1 | 3/2008 | Chien et al. | |
| 2008/0074834 A1 | 3/2008 | Chien et al. | |

* cited by examiner

*Primary Examiner* — Jayprakash N Gandhi
*Assistant Examiner* — Nidhi Desai
(74) *Attorney, Agent, or Firm* — William W. Haefliger

(57) ABSTRACT

A display assembly attachable to a lap top computer cover, having a front face, longitudinally extending laterally spaced edges, and a laterally extending upper edge, comprising a jacket into which a cover is receivable, the jacket having edges adapted to extend externally adjacent corresponding of the cover edges, and means carried by the jacket for visually displaying an image or images, proximate the front face.

1 Claim, 3 Drawing Sheets

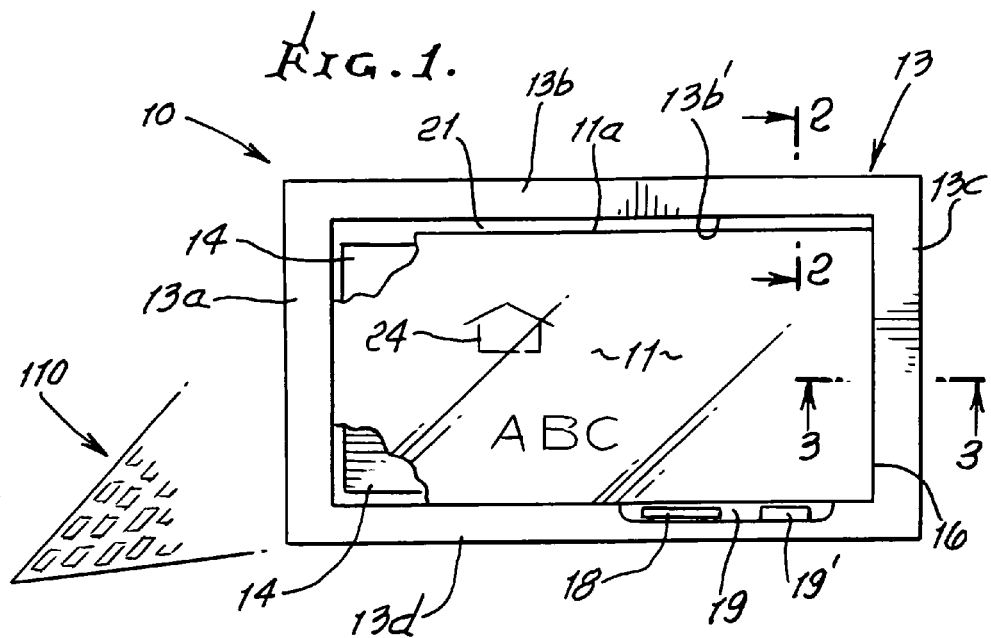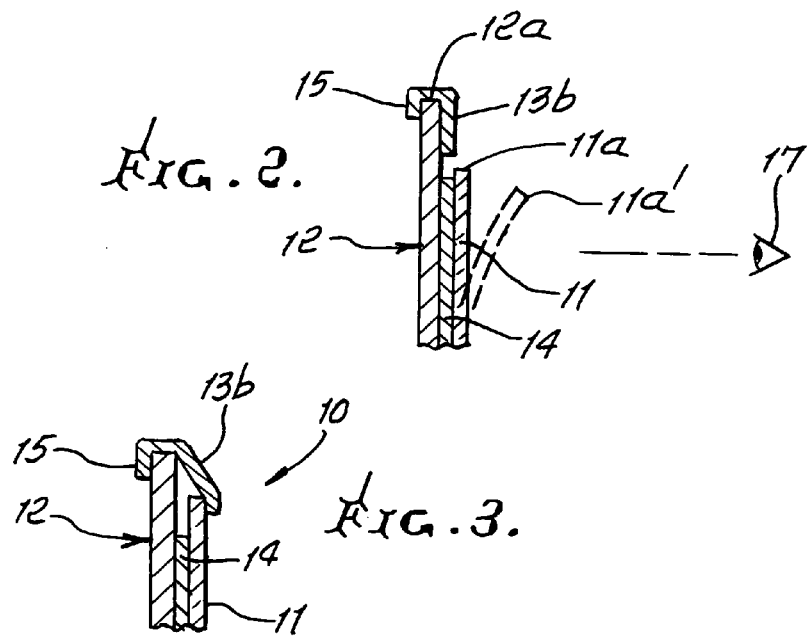

LAP TOP COVER DISPLAY

BACKGROUND OF THE INVENTION

This invention relates generally to enhancement of utility of lap top computers having covers or lids; and more specifically concerns provision of visually observable images in association with structure applied to such covers or lids.

There is a perceived need to enhance the utility of such lap top computer covers, beyond what is digitally provided on screens of such devices. There is also need to provide apparatus enabling displays on such cover, and optimally enabling graphical or written images on such covers.

SUMMARY OF THE INVENTION

It is a major object of the invention to provide improved apparatus meeting such needs. Basically, the apparatus of the invention includes a display assembly attachable to a lap top computer cover, having a front face, longitudinally extending laterally spaced edges, and a laterally extending upper edge, comprising:

a) a jacket into which said cover is receivable said jacket having edges adapted to extend externally adjacent corresponding of said cover edges, b) and means carried by said jacket for visually displaying an image or images, in registration with said front face.

As will be seen, the jacket is typically flexible and easily attached to the lap top cover, as at jacket flexible corners whereby a substantially rectangular image display zone is adapted for presentation opposite or in registration with the lap top cover front face.

Another object includes provision of a transparent panel adapted to extend in closely spaced relation to said cover front, with an image display sheet received therebetween.

Yet another object includes provision of a slot shaped opening located laterally adjacent a lateral edge of said transparent panel for passing said display sheet into the space between said transparent panel and the cover front face.

A further object includes providing a digital frame unit in association with the mounting jacket, to face away from the lap top cover or lid, and so as to enable viewing thereof, and ease of removal from the cover or lid.

These and other objects and advantages of the invention, as well as the details of an illustrative embodiment, will be more fully understood from the following specification and drawings, in which:

DRAWING DESCRIPTION

FIG. 1 is a front view showing preferred apparatus embodying the invention;

FIG. 2 is an enlarged section taken on lines 2-2 of FIG. 1;

FIG. 3 is an enlarged fragmentary section, taken on lines 3-3 of FIG. 1; and

DETAILED DESCRIPTION

Figure 4:
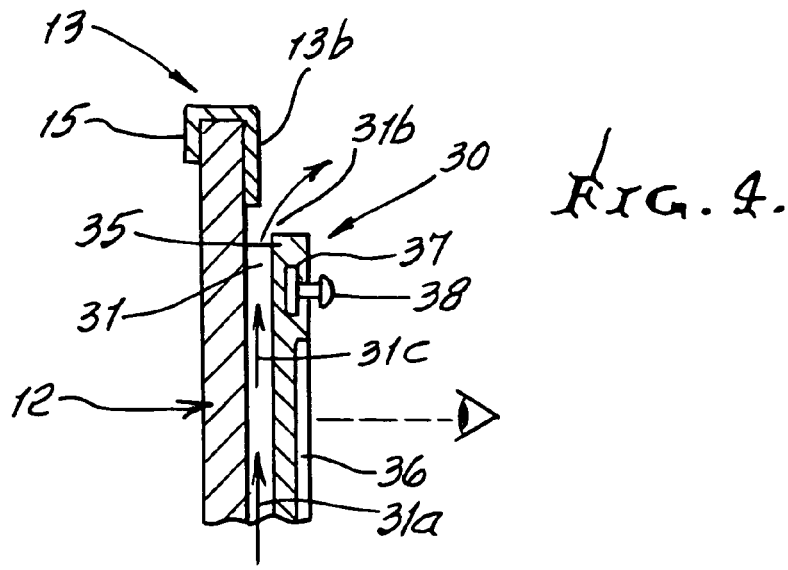
FIG. 4 is a section showing a further modification.

FIGS. 1 and 2 show a cover assembly 10 applicable to the backside of a lap top computer 110 swing up panel 12. The assembly includes a rectangular thin, rectangular frame or jacket 13, preferably flexible and consisting of an elastomer or plastic material, enabling ease of slip-on application to the lap top panel 12. Stretchability of the jacket facilitates ease of slip-on interfit or assembly of the flexible frame pocket-like upper corners 13b to the rigid corners of the lap-top panel 12. The cover frame 13 has thin, elongated border stretches 13a, 13b, and 13c, that stretch lengthwise, and also in cross section, to readily closely fit over the lap top panel edges. FIG. 2 shows horizontal lip 15 that fits over the lap top upper edge 12a, the same close fit provided at the cover frame upright stretches 13a and 13c shown in FIG. 1. Lip or lips 15 can readily be peeled off, to remove the jacket from the lap top cover 12, for storage of the jacket.

Peripherally attached at 16 to the three jacket border stretches 13a, 13c and 13d is a transparent plastic sheet 11, frontwardly viewable as at 17. Sheet 11 is not attached to the jacket top horizontal border stretch 13b, to provide an elongated horizontal access opening 21 between the top edge 11a of sheet 11, and both the panel 12 and the lower edge 13b' of the frame stretch 13b (projecting to a lower level than lip 15). That elongated opening is used to insert a "work" sheet 14, such as a colored template sheet with designs 24 thereon visible at 17, through the transparent sheet 11.

Work or insert sheet 14 (cardboard for example) presents its designs toward plastic sheet 11, which for example can be traced on 11 as by a wet marker 18, shown stored in a jacket pocket 19 in FIG. 1. An eraser 19' can also be stored in the pocket. Various insert sheets 14 for various uses can easily be inserted between 11 and 12, via the elongated upper access opening 21, referred to.

The plastic panel top edge 11a (not attached to 13b) can be pulled back as at 11a', to enlarge the access opening at 21, for ease of insertion and removal of insert sheets 14. This is facilitated by the resiliently yieldable stretchiness of the frame side stretches 13a and 13c. The latter when released also pull the plastic sheet back into close proximity to with the inserted insert sheet 11.

FIG. 4 is a further modification, showing a digital frame device 30 carried by the jacket 13, as by edge bonding to the vertical stretches 13a and 13c as in FIG. 1. A cooling air flow space is provided at 31 between the lap top panel 12 and the rear side of the digital frame, and inlet 31a and outlet 31b openings protectively allow cooling air flow at 31c between the digital frame and the panel. This removes any heat generated by operation of the digital frame, proximate the rear side of the lap top panel. The invention permits ready application i.e. monitoring of a digital frame device, via the flexible jacket 13, which is easily removable, to a lap top computer panel, for use in conjunction with the screen side 12c of the panel, so as to provide materially enhanced information display. The digital frame typically has a rectangular frame body 35, a display screen 36, and internal electronic control circuitry 37, controlled by the user, as at 38.

Figure 5:
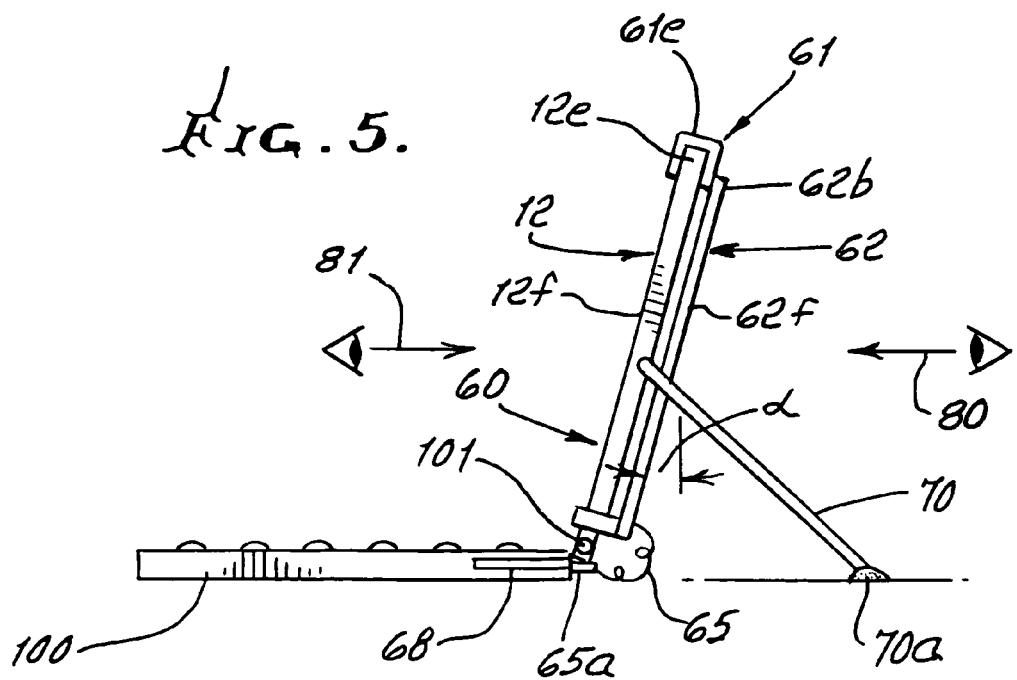
FIG. 5 shows an auxiliary monitor assembled to the lap top computer cover.

FIG. 5 is a section showing a computer lap top monitor panel 60 with a screen facing to the left. A jacket 61, as described above has longitudinal and lateral edges 61a-61d stretch fitted over the corresponding edges 60a-60d of the panel 60 so as to enable assembly and disassembly to 60, as and when desired.

FIG. 5 shows that an auxiliary LCD monitor panel 62 is carried by the jacket 61 (like jacket 13) as at four elongated edges 62a-62d, of 62 and may be connected to 61 as by adhesive bonding, enabling backside viewing in direction 80. The jacket attaches to the lap top panel 12, as at jacket stretchable corners 61e fitting over panel 12 corners 12e. Panel 62 having viewable screen 62*f* may be electrically connected to the computer circuitry 68 via a line 65 and plug 65*a*.

Accordingly, dual lap top computer screens are provided, as at 12*f* and 62*f,* facing in opposite directions, enhancing utility, and ease of removal of 62 is provided.

An adjustable leg 70 may be pivotally carried at 71 by the jacket 61, to swing down and engage a surface at foot location 70*a,* so that the panel 12 and the angularity α of dual screens may be pivotally adjusted and supported for best viewing in two directions, 80 and 81. Alternatively, the lowermost extent of the panel 12 may be hinge connected to base 100, as at 101, with hinge friction holding the panel in adjusted angle position. Such hinging may be provided for all panels disclosed herein.

Figure 6:
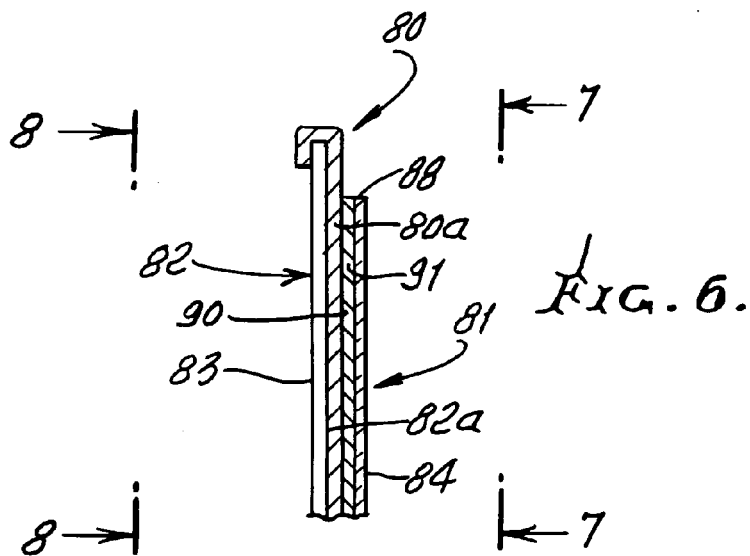
FIG. 6 is a fragmentary section of a modified assembly of elements.
Figure 7:
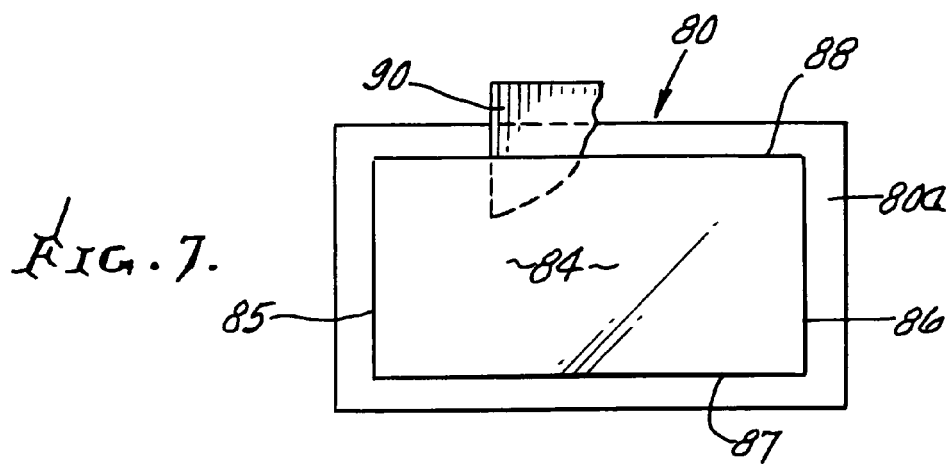
FIG. 7 is a an elevation taken on lines 7-7 of FIG. 6.

FIGS. 6 and 7 show a preferred modification that includes a jacket 80 in the form of an opaque flexible neoprene plastic rectangular sheet 80*a*. Means 81 is provided to be carried by the jacket, for visually displaying an image or images, while the jacket is assembled to a lap top computer rigid cover 82. As shown, the jacket extends adjacent the back face 82*a* of that cover, the front face associated with the display screen indicated at 83.

The means 81 comprises a transparent rectangular plastic sheet 84 having four edges 85-88. Three of the edges 85-87 are heat sealed to the jacket, along such edges. The fourth edge 88 is not sealed to the jacket 80 to allow insertion of a display sheet 91 past edge 88 and into space 91 between the jacket 80 and the transparent sheet 84, at one side of the lap top cover 82 i.e. opposite screen 83 side of the cover.

Figure 8:
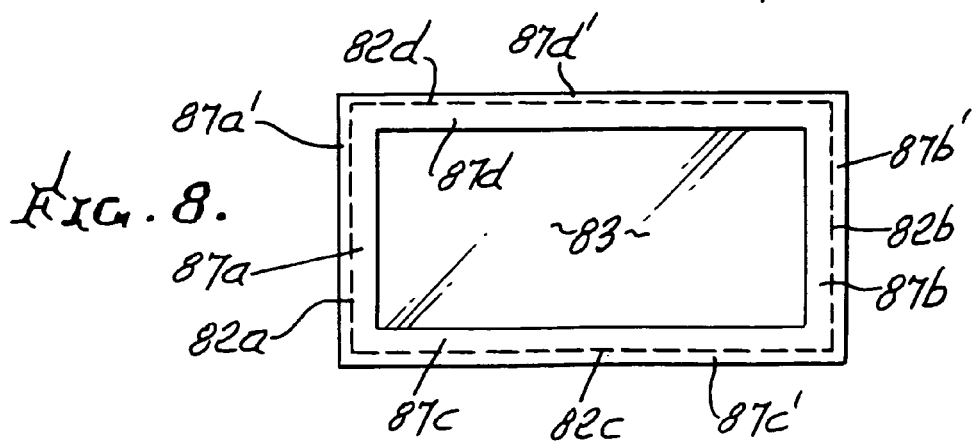
FIG. 8 is an elevation taken on lines 8-8 of FIG. 6.

The jacket 80 has retention edges adapted to extend externally adjacent edges of the lap top cover 82, as for example the four rectangular extending edges of that cover, indicated 82*a*-82*d,* in FIG. 8. Those retention edges are defined by translucent longitudinal and lateral strips 87*a*-87*d*. Strips 87*a*-87*c* are heat sealed to the jacket material along strip outer edges 87*b*'-87*d*'. Strip 87*a* is not heat sealed to the jacket material, but is left loose, to facilitate ease of slip-on attachment of the jacket to the computer cover.

Stitching may be used instead of heat sealing, in the above.

I claim:

1. A display assembly attachable to a lap top computer cover, having a face, longitudinally extending laterally spaced edges, and a laterally extending upper edge, comprising in combination:

a) a jacket receivable onto the cover, said jacket having edges adapted to extend externally adjacent and lapping over corresponding of said cover edges, b) and means carried by said jacket for visually displaying an image or images, in registration with said face, c) and wherein said jacket including said edges is flexible throughout its major extent about a display zone, d) said means defining a substantially rectangular said display zone for said image or images, and adapted to extend opposite said cover face, e) the jacket defining flexible and stretchable pocket corners that closely and stretchably fit over in lapping relation with rigid corners defined by said cover, which is rectangular, f) said jacket corners consist of yieldably flexible stretchable material, enabling peel-off flexible connections to cover corners, g) said means defining a transparent panel adapted to extend in closely spaced relation to said face, with an image display sheet received therebetween, h) there being a slot shaped opening located laterally adjacent a lateral edge of said transparent panel for passing said display sheet into the space between said transparent panel and the cover face, i) and wherein said panel defines a transparent rectangular plastic sheet having four elongated edges, three of which are connected to the jacket, and the fourth edge not being connected to the jacket to allow insertion of a display sheet past said fourth edge and between the jacket and the transparent sheet, at one side of the jacket, j) there being jacket material everywhere bounding the transparent sheet which is stretchable and enabling stretching of said material at said pocket jacket corners during fitting of said pocket corners to said cover rigid corners, to enable said peel-off connections thereto, the jacket having upper extent between said transparent sheet and the two upper corners defined by the jacket, the entirety of said jacket upper extent being free of any attached pockets at its front and back sides and being everywhere flexible and stretchable to enable its ready manual manipulation during said peel-off of the jacket upper corners from the cover rigid corners, k) the jacket being flexible throughout its major extent, l) the jacket corners consisting of yieldably flexible material.

\* \* \* \* \*